United States Patent Office 3,842,139
Patented Oct. 15, 1974

3,842,139
DEHYDROGENATION OF PARAFFINS OVER A PLATINUM MAGNESIUM ALUMINATE SPINEL
William L. Kehl and Raymond J. Rennard, Jr., Pittsburgh, Pa., assignors to Gulf Research & Development Company, Pittsburgh, Pa.
No Drawing. Filed Mar. 12, 1973, Ser. No. 340,030
Int. Cl. C07c 5/20
U.S. Cl. 260—683.3           15 Claims

ABSTRACT OF THE DISCLOSURE

A process is provided for the dehydrogenation of paraffins such as propane by contacting the propane together with a small but effective quantity of a sulfur compound such as $H_2S$ in the vapor phase with a catalyst comprising platinum on a magnesium aluminate spinel support. $C_4$ and $C_5$ paraffins can be efficiently dehydrogenated over the same catalyst without the need for the added sulfur containing compounds.

SPECIFICATION

This invention relates to the dehyrogenation of saturated aliphatic hydrocarbons and more particularly to the dehydrogenation of propane in the presence of sulfur compounds such as $H_2S$ and in the presence of a novel catalyst comprising platinum on a support comprising a magnesium aluminate spinel.

The production of olefins from paraffins has always been an area of great interest to the petroleum and petrochemical industries. In recent years this interest has been increased due to a rising demand for olefinic materials, especially the lower carbon number olefins, such as propylene and isobutylene for use in the production of polymers and high octane number gasoline alkylate. Olefins such as butenes and isoamylenes are in demand, mainly for the production of the reactive butadiene and isoprene monomers. Studies have been made on the thermodynamic equilibrium of paraffin-olefin mixtures, and it has been found, as expected, that the concentration of olefins at equilibrium increases as the temperature increases. However, as light paraffinic materials, especially propane, are subjected to increased temperatures, another equilibrium to the formation of carbon and hydrogen is also favored. Thus over most catalysts, excessive coking reduces the efficiency of the catalyst and limits any process to very short reaction cycles between regenerations. Prior dehydrogenation processes have employed various alkali doped chromia-aluminas, and these materials are prone to high coke laydown and thus short reaction cycles of about 5 to 60 minutes. An improved dehydrogenation process has now been discovered which overcomes many of the disadvantages of the prior art processes and provides high selectivity coupled with high conversions. Relatively low coke yields are achieved and thus the process can be run for extended periods of time without the necessity of regenerating.

In accordance with the invention, an improved process for the dehydrogenation of saturated aliphatic hydrocarbons having at least 3 carbon atoms per molecule has been discovered which comprises Contacting at least one of said hydrocarbons and a minor amount of a sulfur containing compound selected from the group consisting of $H_2S$ and an organic sulfur containing compound capable of forming $H_2S$ under the conditions of reaction in the vapor phase under dehydrogenation conditions including a temperature from 300° C. to 700° C.

With a catalyst comprising platinum on a support comprising a magnesium aluminate spinel having a surface area from 10 to 250 m.²/g.

It has further been found, quite unexpectedly, that paraffins having at least four carbon atoms dehydrogenate selectively over the same platinum magnesium aluminate spinel without the need for the added sulfur containing compounds, albeit the sulfur compounds also improve these reactions. The use of mixed alumina-magnesium aluminate spinels containing platinum for the dehydrogenation of cyclohexane has been suggested in an article entitled "Activity and State of Platinum in Catalysts on Spinel Carriers. Dehydrogenation of Cyclohexane on Platinum Applied on Magnesium-Aluminum and Zinc-Aluminum Spinels I" by Nikiforova, N.V.; Mostovaya, L. Ya.; Zaretskii, M. V.; Kozlov, N. S. (Inst. Fiz.-Org. Khim., Minsk, USSR), in the Russian Journal *Vestsi Akad. Navuk Belarus. SSR, Ser Khim. Navuk*, 1970 (4), 61–4 (Russ), as reported in Chemical Abstracts in abstract number 16051f, Vol. 74, 1971. When propane is utilized as the charge stock, however, very poor results are obtained using the magnesium aluminate spinel support compared to the use of alumina as a support. As will be shown, the addition of sulfur compounds along with the propane results in a very large increase in selectivity to the formation of propylene and in a decreased amount of coke formation. From these data it was expected that other straight chain paraffins such as butane and isopentane would react similarly to the propane in the absence of the sulfur compounds. Quite to the contrary, it was found that paraffins having 4 to 5 carbon atoms per molecule dehydrogenate efficiently in the absence of $H_2S$ or other sulfur compounds utilizing a catalyst comprising Pt supported on a magnesium aluminate spinel having sufficient surface area. The addition of sulfur compounds further improves the dehydrogenation of $C_4$–$C_5$ paraffins.

CHARGE STOCK

The charge stock for the process of this invention can be one or more saturated aliphatic hydrocarbons having at least 3 carbon atoms per molecule when certain sulfur compounds are added to the reaction zone, and preferably the charge stock is a lower carbon number paraffin, such as a paraffin having from 3 to 5 carbon atoms per molecule. When the sulfur compounds are omitted, the charge stock suitably has at least four carbon atoms, preferably 4 to 5 carbon atoms. Minor amounts of olefinic material, say from 0.1 to 10 weight percent, can be present without adversely affecting the reaction. The presence of these olefinically unsaturated components is not desired as they tend to affect the equilibrium in an adverse manner. It is preferred that highly unsaturated diolefins be excluded. Examples of suitable preferred saturated aliphatic hydrocarbons include but are not limited to propane, butane, isobutane, pentane, isopentane, hexane, and 2,3-dimethylbutane.

The catalyst for the process of this invention comprises platinum on a support comprising a magnesium aluminate spinel having a surface area from 10 to about 250 m.²/g. The platinum can be applied to the support in quantities of, for example, 0.01 to 5 percent by weight. Preferably the concentration of platinum is from 0.01 to 2 percent by weight of the support. The platinum can be deposited on the support by any suitable means. For example, the support can be impregnated with an aqueous platinum salt solution followed by precipitating the platinum on the support by reduction with formaldehyde in an alkali solution. However, the platinum in the form of a salt, e.g. a nitrate or as an organic salt, e.g. an acetate can be impregnated onto the spinel support and thereafter converted into the metal by reduction with hydrogen at elevated temperatures.

Magnesium aluminate spinels are known in the art. High temperature fusion processes are utilized in the art to synthesize spinel. Generally, these high temperature fusion processes yield materials having substantially no pores, having an extremely smooth surface and being of gem quality. In fact, high quality synthetic stones for jewelry are chemically magnesium aluminate spinel having the formula $MgAl_2O_4$ and essentially no surface area.

Obviously such smooth spinels having a lack of porosity and minimal surface area cannot be employed as catalysts or catalyst supports.

It has previously been suggested in the art that certain spinels could be made by means of a chemical process and that the product of such process would have a comparatively high surface area. One such technique was suggested in U.S. Patent 2,992,191 wherein it was proposed to form a magnesium aluminate spinel ($MgAl_2O_4$) by reacting in an aqueous medium a soluble inorganic magnesium salt and a soluble aluminum salt, in which salts the aluminum was present as the anion and the magnesium was present in the cation, such as, for example, magnesium nitrate and sodium aluminate. While techniques such as this would appear to produce a spinel, such processes inherently contaminate the product by the inclusion of undesired sodium. Thus, when employing sodium aluminate and magnesium nitrate, as mentioned above, sodium is inherently incorporated in the product spinel.

U.S. Pat. 3,459,657 suggests preparing aluminum spinels by starting with highly active aluminum oxide in lump form and having a high surface area and impregnating this material with a solution of a compound (salt or hydroxide) of the spinel-forming metal to be used.

The magnesium-aluminate spinels which are used as a support for the catalyst to be used in the process of this invention have surface areas from about 10 to about 250 m.$^2$/g., preferably 40 to 200 m.$^2$/g. In addition, the mean pore diameter is advantageously, although not necessarily, from 50 to 250 A. The magnesium aluminate spinel can be generally represented by the formula: $Mg_aAl_bO_4$ where $a$ will have a value of about 1 and $b$ will have a value of about 2.

Preferably the spinel supports are prepared by utilizing as starting materials salts of the metals which are to appear as components of the spinel product, in which salts the metals appear as cations. These salts are added to a volatilizable or sodium-free base while maintaining the pH of this addition mixture above about 8, preferably above about 9. The addition of the base to the salts, is, of course, unsatisfactory as invariably the pH is substantially below 7. The addition of the metal salts to the base causes the precipitation of the metal oxide precursor, which is then washed, also at a pH within a range mentioned above, dried and calcined to give the desired spinel product.

Broadly, the crystallographic unit cell of the spinel structure contains 32 approximate cubic close-packed oxygen atoms, and there are equivalent positions in this cell for 8 atoms surrounded tetrahedrally by 4 oxygen atoms and for 16 atoms surrounded octahedrally by 6 oxygen atoms. Thus, the chemical formula for this unit cell can be expressed as 8 $XY_2O_4$, in which the 8 X atoms are considered to be placed in tetrahedral coordination while the 16 Y atoms are considered to be placed in octahedral coordination. In certain spinels the X and Y atoms are aranged differently. In such spinels the 8 tetrahedral positions are occupied by 8 of the Y atoms, while the remaining 8 Y atoms and the 8 X atoms are arranged in the 16 octahedral positions. These "inverse" spinels are conventionally represented as $Y(XY)O_4$ to distinguish them from normal spinels which are conventionally represented as $XY_2O_4$. The nature of a spinel can be conveniently described by the parameter $\lambda$, fraction of Y atoms in tetrahedral sites. For a normal spinel, $\lambda=0$ because none of the Y atoms are in tetrahedral sites. For an inverse spinel, $\lambda=\frac{1}{2}$, i.e. one-half of the Y atoms are in tetrahedral sites. The spinels of this invention include those in which $\lambda=0$ and $\lambda=\frac{1}{2}$, as well as all intermediate values. For $\lambda$ values between 0 and $\frac{1}{2}$, the spinels are called random spinels and are partially inverse. For a random spinel there is a random distribution of the divalent (Mg) and trivalent (Al) metals in the octahedral and tetrahedral sites in any given unit cell. Random spinels are formed because the octahedral site preference energies of Al$^{+3}$ and Mg$^{+2}$ are about the same, i.e. —2.5 and —5.0 Kcal./gr.at.wt. (See A. Miller, *Journal of Applied Physics,* Supplement to Vol. 30, p. 245 (1959).)

Preferably the magnesium aluminate spinel is prepared by employing as starting materials salts of the metals which are desired in the metal oxide product, in which salts the metals are contained as cations. Any such salt of the desired metal is satisfactory. It is preferred to employ salts of the metals such as, for example, the nitrates, acetates and halides. Considering the magnesium salt, the preferred magnesium salts include magnesium nitrate [$Mg(NO_3)_2 \cdot 6H_2O$]; magnesium acetate [$Mg(C_2H_3O_2)_2$]; and magnesium chloride [$MgCl_2$ or $MgCl_2 \cdot 6H_2O$].

An amount of each of the aluminum and magnesium salts is employed to stoichiometrically satisfy the formula $MgAl_2O_4$. Solutions of these salts, preferably aqueous, are made up, and preferably an admixed aqueous solution of the metal salts is contacted with a basic reactant in order to precipitate the precursor of the finally desired magnesium aluminate spinel. Usually the solution of the salts has a low pH in the acidic range. This solution is added to a basic reactant, and it is necessary to maintain the addition mixture at a high pH of above about 8 and preferably above about 9. This is normally done by the addition of a basic material such as ammonium hydroxide to the addition mixture. Because of the necessity to maintain the addition mixture at such a high pH it is not feasible to add the base to the acidic metal salt solutions as this invariably results in a pH of the addition mixture below about 7. The addition mixture should, of course, be vigorously stirred to reduce any pH gradients.

Any base which can be readily vaporized under the conditions used for drying and calcining can suitably be employed in forming magnesium aluminate spinel. For example, ammonium carbonate, ammonium bicarbonate and ammonium hydroxide are preferred bases. Especially preferred is an aqueous ammonia solution. After precipitation the precursor is suitably washed again at a pH above about 8, preferably above about 9 and is then dried and calcined. Drying and calcining can effectively be accomplished by any technique well known in the art. Generally, however, drying can be effected at temperatures from about 100° C. to about 150° C. for periods of from about 4 to about 60 hours. Calcining can be effected at temperatures ranging from about 350° C. to about 700° C. for a period from about 2 to about 16 hours. Increased temperatures of calcination should be discouraged as these higher temperatures have a deleterious effect on the surface area of the resulting spinel.

The reaction is run by contacting the saturated hydrocarbon charge stock in the vapor phase with the novel catalyst of this invention under dehydrogenation conditions. A fluid bed operation can be employed or a fixed-bed operation with an up or down flow. Preferably the charge stock is preheated and passed downflow through a fixed bed of suitably sized catalyst particles.

Dehydrogenation is promoted by a reduced pressure operation or by reducing the partial pressure of the saturated hydrocarbon charge stock by the presence of a second suitable gas phase. An inert gas such as nitrogen can be used, but this normally is too expensive, especially from a separations standpoint. Usually and preferably the dehydrogenation reaction is operated in the presence of added hydrogen. The adverse effect of the presence of hydrogen from a mass action standpoint is more than outweighed by the beneficial effect of hydrogen from the reduced partial pressure of hydrocarbon and coke standpoints. The hydrogen to hydrocarbon molar ratio can be from 1:1 to 20:1 but is preferably 1:1 to 5:1. The hydrogen can be suitably admixed with the hydrocarbon at any time prior to entry into the reaction zone. Some hydrogen may be added throughout the reaction zone if desired. The use of substantially pure hydrogen stream is preferred, but reformer hydrogen containing relatively small amounts of gases such as methane can suitably be employed.

The reaction temperature should be such that the saturated hydrocarbon charge stock and the reaction products are maintained in the vapor phase in the reaction zone. In general the reaction temperature is from 300° C. to 700° C. The preferred temperature depends, of course, on the particular saturated hydrocarbon charge stock employed; the lower carbon number charge stocks requiring the higher temperatures. For example, the prefered temperature ranges for the dehydrogenation of $C_3$, $C_4$ and $C_5$ paraffins are 575° C. to 650° C.; 500° C. to 600° C.; and 480° C. to 570° C., respectively. The higher carbon number paraffins would utilize the lower temperatures within the range disclosed above. The upper temperature is controlled by the amount of cracking which can be tolerated.

The operating pressure is usually atmospheric for economic reasons. Higher pressures give decreased conversions and therefore offer no advantages. The pressures should, of course, be high enough to pass the reactants through the reaction system. Suitable pressures can therefore be from about 0.5 to about 2 atmospheres with atmospheric pressure, of course, preferred.

The gas hourly space velocity (GHSV) is suitably from about 300 to about 3600 volumes of hydrocarbon per volume of catalyst per hour, with the preferred space velocity being from 600 to 1800 GHSV.

The products of the reaction are cooled upon leaving the reaction zone and liquefied in the case of a higher carbon number product, i.e., those having at least four carbon atoms per molecule. In the case where propane is used as the charge stock, propylene is separated from the other reaction products by fractionation. Other unsaturated derivatives besides the desired monoolefins can be formed, such as di- and triolefins if the reaction conditions are too severe. The optimum conditions of operation can readily be determined for the formation of the desired monoolefin by anyone having ordinary skill in the art following the outline of conditions given above.

As noted above, the addition of certain sulfur compounds to the charge stock in minor but effective concentrations quite unexpectedly enhances the selectivity of the reaction to the formation of monoolefins and reduces the formation of coke. The sulfur containing compounds which can be employed are selected from the group consisting of $H_2S$ and organic sulfur containing compounds capable of forming $H_2S$ under the conditions of reaction. Suitable sulfur containing compounds include $H_2S$; $CS_2$; saturated aliphatic mercaptans such as those having from 1 to 5 carbon atoms as exemplified by methanethiol; ethanethiol; propanethiols; butanethiols; and pentanethiols; and cyclic sulfur compounds such as thiophene; and substituted thiophenes where the substituents are lower hydrocarbon radicals such as those having from 1 to 3 carbon atoms, e.g. methylthiophene.

A minor but effective amount of such sulfur containing compounds should be employed. In general the concentration is suitably from 10 to 1000 p.p.m. by gaseous volume of the total reaction mixture including the paraffin and hydrogen, if employed. Preferably the concentration is from 25 to 600 p.p.m. $H_2S$ is the preferred sulfur containing compound for use with propane and butanes, and thiophene is preferred for use with the $C_5$ saturated hydrocarbons since the thiophene is liquid and can easily be metered into the charge before preheating. The sulfur containing compound can also, if desired, be separately preheated and added with the hydrogen to any convenient portion of the reaction zone. Preferably the sulfur containing compound is added to the charge stock as it enters the reaction zone. The smallest but effective concentration of a sulfur containing compound is preferred since the products are preferably as sulfur-free as possible.

As the reaction proceeds, the conversion is reduced and activity is maintained by gradually increasing the reaction temperature. Eventually the activity of the catalyst is such that even at increased temperatures the conversion to the desired monoolefins is lower than can economically be tolerated, and the run must be terminated. The catalyst can then be regenerated, preferably by heating in the presence of a gas containing free molecular oxygen to a temperature from 350° C. to 650° C. Air is the preferred oxidizing gas, but any inert gas containing from 2 to 20 volume percent free molecular oxygen can be employed. Preferably regeneration temperatures are from 400° C. to 500° C. The need for regeneration is usually occasioned by the formation of undesired coke which masks the catalytic sites. Regeneration to remove coke, however, is also believed to result in some migration of platinum to form larger and less active crystallites. One of the advantages of the use of the spinels of this invention as the catalyst base is the reduced tendency of the platinum to migrate and form inactive large crystallites during oxidative regeneration.

Eventually, however, the activity of the catalyst after repeated oxidative regenerations is too low to be of interest, and the platinum must be redispersed by suitable techniques known in the art.

The invention will be further described with reference to the following experimental work.

A typical preparation of a magnesium aluminate spinel used as the base for the catalyst of this invention is given below.

5,625 grams of $Al(NO_3)_3 \cdot 9H_2O$ were dissolved in 15 liters of distilled water. A separate solution of 1,924 grams of $Mg(NO_3)_2 \cdot 6H_2O$ in 5 liters of distilled water was prepared. Both of these solutions were clear, and they were then combined with thorough mixing. The resultant admixture had a pH of 2.19. A quantity of $NH_4OH$ (28% $NH_3$ in water) was added to 22.5 liters of water until the pH was 10.0. While vigorously stirring the aqueous ammonia, the solution of metal salts was added gradually in a thin stream by means of a pipet to the aqueous ammonia. By means of a second pipet, a thin stream of additional aqueous ammonia was added to the reaction mixture to maintain the pH at 10.0. After all of the metal salt solution was added, stirring was continued for an additional two hours. It should be noted that upon addition of the metal salt solution to the aqueous ammonia, the spinel precursor was precipitated. The slurry was then allowed to stand overnight to allow the precipitate to settle out. The precipitate was then removed from the reaction mixture and washed with 7.5 liters of water. The filter cake was then dried at 120° C. for 16 hours. The dried solids were calcined in two stages, first at 400° C. for 16 hours; then at 600° C. for 16 hours. Analysis of the dried product by X-ray diffraction indicated the material was $MgAl_2O_4$, having the spinel structure. Neutron activation analysis indicated that the magnesium and aluminum composition corresponded to that of $MgAl_2O_4$. The surface area was in the range of about 125 m.²/g. A typical X-ray diffraction pattern is given in Table A below:

TABLE A

| d (A.) | $I/I_2$ (Relative Intensities) |
|---|---|
| 4.67 | 18 |
| 2.86 | 10 |
| 2.44 | 100 |
| 2.02 | 72 |
| 1.556 | 20 |
| 1.427 | 76 |

The final catalysts were prepared by impregnating the dried $MgAl_2O_4$ with an aqueous solution of chloroplatinic acid by the technique of minimum excess solution (so-called incipient wetness). After impregnation, the catalysts were dried at 120° C. overnight and calcined at 500° C. overnight (about 16 hours).

All experiments were carried out in a ¾" I.D. tubular quartz reactor, heated by a 13" tubular furnace. Temperature within the catalyst bed was determined by means of a concentric thermocouple well running the length of the reactor. Gas feeds were controlled by calibrated gas flow regulators. Liquid feeds were supplied through either liquid flow regulators or mechanical pumps. The top section of the reactor was packed with an inert material which was used to preheat and mix the feeds. Sulfur was added to the feed either as $H_2S$ or thiophene. In all experiments, 10 cc. of a 20-mesh catalyst were loaded into the reactor without dilution.

The catalysts were initially prereduced in flowing hydrogen for at least 30 minutes at 500° C. before reaction was begun. Again, prior to regeneration, the catalysts were reduced in flowing hydrogen for from 30 minutes to two hours. When regeneration occurred, it was carried out usually at 500° C. in either flowing air or in an air-helium mixture. The regenerations were monitored by gas-liquid chromatography and were considered complete when the production of carbon dioxide ceased.

Total catalyst surface areas were determined by B.E.T. nitrogen adsorption. Platinum metal surface areas were determined by hydrogen adsorption or calculated from platinum particle size distributions obtained from electron micrographs.

A first series of runs was made using propane as the saturated hydrocarbon charge stock. Equilibrium constants and equilibrium conversions for the dehydrogenation of propane for a 3:1 mole ratio of hydrogen to propane were initially determined. The calculated equilibrium mole percent conversion of propane to propylene at 500° C.; 550° C.; and 600° C. were, respectively, 4.2; 12.8; and 29.9. These figures show that in order to obtain a reasonable yield of propylene, temperatures of about 575° C. or higher must be employed. Under these conditions, the reaction is not selective over most catalysts, and coke yields are prohibitively high. Results of these runs are summarized in Table I below. The sulfur was present as hydrogen sulfide. The "Time:Hrs" is the reaction time for the given run which in most cases was 5.5 hours. The "Number of Regenerations" indicates the number of regenerations the catalyst had undergone before the cycle defined in the Example. Each regeneration involved heating the catalyst at 500° C. in flowing air until no $CO_2$ was emitted from the reactor. The "Coke" figures were obtained by regeneration of the catalyst after the cycle defined in the Example.

Referring to Table I, Examples 1–3 show an increased selectivity as the sulfur increases to 425 p.p.m. (as $H_2S$).

Examples 4 and 5 also show increased selectivity with sulfur addition, but at a lower level of platinum (0.3%). Example 6 compared with Example 1 shows the addition of 0.3% rhenium increases conversion, but this is believed to be the result of increased total metal content (0.8% for Example 6 versus 0.5% for Example 1). Nevertheless, Example 6 does show that other hydrogen ion metals can be added to the catalysts of this invention. The addition of sulfur increases the selectivity of the platinum-rhenium combination (Example 7) to about the same level as Example 3.

Examples 8–11 illustrate the use of catalysts consisting of 0.5% platinum on eta- and gamma-aluminas, both with and without sulfur addition. Note that the addition of sulfur to the eta-alumina catalyst (Example 9 compared with Example 8) has little if any effect; while the addition of sulfur to the gamma-alumina catalyst (Example 11 compared with Example 10) increases selectivity slightly, but this effect is not lasting, as will be shown in Table II below. A comparison of the results of Examples 8–11 with Examples 1–5 shows the unexpected effect of the addition of sulfur compounds when the support for the platinum catalyst is the magnesium aluminate spinels of this invention.

Besides the adverse effect of sulfur on the catalysts supported on the eta- or gamma-aluminas, the alumina supported catalysts have poor regeneration characteristics. This is shown in Table II below.

A second series of runs was made using propane as the charge stock in which the effect of regeneration of the catalyst on the activity and selectivity was determined. The results are summarized in Table II below. In Examples 12–14 and 17–19, the catalyst was regenerated after a 24-hour reaction cycle. The regeneration was carried out by heating at 500° C. in a stream of flowing air until no $CO_2$ was emitted from the reactor. In Examples 15 and 16, the catalyst was regenerated in the same manner after a 5.5 hour reaction cycle.

TABLE II

[Effect of regeneration on the dehydrogenation of propane over various catalysts]

| Ex. no. | Catalyst | Sulfur, p.p.m. | Reaction periods | Number of regenerations | Mole percent Conv. | Mole percent Selec. |
|---|---|---|---|---|---|---|
| 12 | 0.5% Pt on $MgAl_2O_4$. | 200 | a 4 | 3 | 29 | 92 |
| 13 | 0.5% Pt on $MgAl_2O_4$. | 200 | a 6 | 5 | 28 | 94 |
| 14 | 0.5% Pt on $MgAl_2O_4$. | 200 | a 8 | 7 | 21 | 98 |
| 15 | 0.5% Pt on $\gamma$-$Al_2O_3$. | 450 | b 1 | 1 | 26 | 78 |
| 16 | 0.5% Pt on $\gamma$-$Al_2O_3$. | 450 | b 4 | 3 | 16 | 38 |
| 17 | 0.5% Pt on $\eta$-$Al_2O_3$. | 0 | a 1 | 0 | 23.7 | 58.0 |
| 18 | 0.5% Pt on $\eta$-$Al_2O_3$. | 0 | a 2 | 1 | 15.5 | 62.8 |
| 19 | 0.5% Pt on $\eta$-$Al_2O_3$. | 0 | a 3 | 2 | 6.8 | 66.8 | a 24-hour reaction period.
b 5.5 hour reaction period.

TABLE I

[Effect of sulfur on propane dehydrogenation catalysts at 600° C. and a hydrogen to propane ratio of three to one]

| Catalyst | GHSV | Sulfur, p.p.m. | Time, hrs. | Mole percent Conv. | Mole percent Select. | Number of regenerations | Coke* |
|---|---|---|---|---|---|---|---|
| Example number: | | | | | | | |
| 1 ... 0.5% Pt-$MgAl_2O_4$ | 1,200 | 0 | 5.5 | 31 | 47 | 0 | 40 |
| 2 ... 0.5% Pt-$MgAl_2O_4$ | 1,200 | 25 | 5.5 | 32 | 84 | 2 | 6 |
| 3 ... 0.5% Pt-$MgAl_2O_4$ | 1,200 | 425 | 5.5 | 29 | 95 | 1 | 4 |
| 4 ... 0.3% Pt-$MgAl_2O_4$ | 1,200 | 0 | 5.5 | 37 | 51 | 0 | 50 |
| 4 ... 0.3% Pt-$MgAl_2O_4$ | 1,200 | 200 | 4.5 | 30 | 89 | 2 | 3 |
| 6 ... 0.5% Pt-0.3% Re/-$MgAl_2O_4$ a | 1,200 | 0 | 3.5 | 44 | 40 | 0 | 57 |
| 7 ... 0.5% Pt-0.3% Re/-$MgAl_2O_4$ a | 1,200 | 200 | 4 | 36 | 91 | 2 | 6 |
| 8 ... 0.5% Pt- $\eta$-$Al_2O_3$ | 1,200 | 0 | 4.5 | 22 | 51 | 0 | 32 |
| 9 ... 0.5% Pt- $\eta$-$Al_2O_3$ | 1,200 | 425 | 4.5 | 23 | 56 | 1 | 38 |
| 10 ... 0.5% $\gamma$-$Al_2O_3$ | 1,200 | 0 | 5.5 | 28 | 63 | 0 | 42 |
| 11 ... 0.5% $\gamma$-$Al_2O_3$ | 1,200 | 850 | 5.5 | 26 | 78 | 1 | 33 |

*$\dfrac{\text{Gms. carbon}}{\text{Gms. catalyst/hr.}} \times 10^{-4}$.

a In runs 6 and 7, the support was calcined at 400° C. and then 800° C. before platinum impregnation.

Referring to Tables I and II, it can be seen by comparing Examples 10, 11, 15 and 16 that the addition of sulfur to the gamma-alumina based catalyst initially gives a slight improvement in selectivity, but the catalyst loses activity and selectivity after only three regenerations. These data should be contrasted with Examples 12–14 which show the catalysts of this invention can be repeatedly regenerated without losing selectivity.

A further comparison of the Examples in Tables I and II shows the catalysts of this invention in the presence of sulfur compounds results in unexpectedly high selectivities for the conversion of propane to propylene, and perhaps more importantly, the activity and selectivity of the catalysts of this invention is maintained through repeated oxidative regenerations.

Examination of the catalysts from Table III after regeneration both with and without sulfur by electron microscopy showed extensive sintering of the platinum in the catalysts of Examples 20 through 27 (i.e. the platinum on $Al_2O_3$ catalysts) after only one regeneration with only a gradual increase in platinum crystallite size observed through seven regenerations for the spinel supported catalysts—Examples 28–31.

An added series of runs was made using propane as the charge stock to determine the long-term effect of sulfur on the platinum and platinum-rhenium magnesium aluminate spinel supported catalysts of this invention. The results of these runs are summarized in Table IV below.

TABLE IV
[Propane dehydrogenation over extended reaction periods using Pt and Pt-Re/$MgAl_2O_4$ catalysts]

| Example number | Catalyst | Temp., °C. | Sulfur, p.p.m. | Time, hrs. | Mole percent | |
|---|---|---|---|---|---|---|
| | | | | | Conv. | Selec. |
| 32 | 0.5% Pt-$MgAl_2O_4$ | 600 | 18 | 2.5 | 35 | 77 |
| | | | | 24 | 28 | |
| 33 | 0.5% Pt-$MgAl_2O_4$ | 600 | 425 | 2.5 | 30 | 94 |
| | | | | 24 | 25 | 97 |
| | | | | 50 | 21 | 100 |
| | 0.3% Pt-$MgAl_2O_4$ | 600 | 200 | 2.5 | 32 | 89 |
| | | | | 28 | 26 | 94 |
| | | | | 52 | 23 | 92 |
| | | | | 96 | 20 | 96 |
| 35 | 0.5% Pt-0.3% Re/$MgAl_2O_4$ a | 600 | 200 | 1 | 36 | 85 |
| | | | | 24 | 30 | 94 |
| 36 | 0.5% Pt-0.3% Re/$MgAl_2O_4$ | b 600–620 | 200 | 2.5 | 29 | 92 |
| | | | | 240 | 29 | 95 | a Support calcined at 400° C. then 700° C. before platinum impregnation.
b Temperature raised 20° C. over ten-day period.

Examples 17–19 show the use of a Pt on eta-alumina loses activity very rapidly in the absence of sulfur while selectivity is maintained. A comparison of Examples 15 and 16 with Examples 17–19 shows with or without sulfur the activity decreases for alumina supported platinum catalysts for the dehydrogenation of propane. As noted, activity and selectivity are maintained for the dehydrogenation of propane using the platinum spinel catalysts of this invention when sulfur is added to the feedstock.

Another series of runs was made using a different procedure than from Runs 1 to 19 above. In these new runs, a 15 cc. bed of catalyst was used and the flows were adjusted to maintain a GHSV of 1200 volumes of propane per volume per hour. The temperature was maintained at 600° C. and pressure was atmospheric. After each 24-hour cycle, the catalyst was reduced in $H_2$ for two hours at 600° C. and cooled to room temperature in helium. One-half of the catalyst was removed and regenerated as above, i.e. at 500° C. in flowing air until no $CO_2$ was detected. The regenerated catalyst was replaced and further cycles run as noted in Table III below.

Referring to Table IV above, it can be seen that the duration of the runs varied from 24 hours (Examples 32 and 35) to 240 hours (Example 36). The runs in Table IV show that there is a gradual decrease in activity as the reaction period increases. Constant activity can be maintained for much longer periods by slight increases in the operating temperatures as shown in Example 36 where constant activity was maintained over a 10-day period by increasing the temperature 20° C.

Another series of runs was made using a platinum-$MgAl_2O_4$ catalyst and isopentane as the charge stock, both with and without the addition of trace quantities of sulfur. The results of this series of runs are summarized in Table V below.

TABLE III
[Effect of regeneration on the dehydrogenation of propane over various catalysts]

| Example number | Catalyst | Sulfur, p.p.m. | Total 24-hr., days on-stream | Number of regenerations | Mole percent | |
|---|---|---|---|---|---|---|
| | | | | | Conv. | Selec |
| 20 | 0.5% Pt on $Al_2O_3$ (commercial) | 0 | 1 | 0 | 23.8 | 72.8 |
| 21 | 0.5% Pt on $Al_2O_3$ (commercial) | 0 | 2 | 1 | 15.0 | 67.7 |
| 22 | 0.5% Pt on $Al_2O_3$ (commercial) | 0 | 3 | 2 | 9.9 | 70.2 |
| 23 | 0.5% Pt on $Al_2O_3$ (commercial) | 0 | 4 | 3 | 8.7 | 59.8 |
| 24 | 0.5% Pt on $Al_2O_3$ (commercial) | 200 | 1 | 0 | 18.3 | 92 |
| 25 | 0.5% Pt on $Al_2O_3$ (commercial) | 200 | 2 | 1 | 12.7 | 93 |
| 26 | 0.5% Pt on $Al_2O_3$ (commercial) | 200 | 3 | 2 | 5.3 | 97 |
| 27 | 0.5% Pt on $Al_2O_3$ (commercial) | 200 | 4 | 3 | 3.7 | 93 |
| 28 | 0.5% Pt-$MgAl_2O_4$ | 200 | 1 | 0 | 23.5 | 91.2 |
| 29 | 0.5% Pt-$MgAl_2O_4$ | 200 | 3 | 2 | 21.1 | 92.6 |
| 30 | 0.5% Pt-$MgAl_2O_4$ | 200 | 5 | 4 | 23.0 | 91.3 |
| 31 | 0.5% Pt-$MgAl_2O_4$ | 200 | 7 | 6 | 23.0 | 95.0 |

Referring to Table III, it is again seen that the Pt-$MgAl_2O_4$ catalysts in the presence of sulfur maintain their activity and selectivity over repeated cycles, even when only half of the bed is regenerated. The Pt on $Al_2O_3$ rapidly loses activity both with and without sulfur addition.

The sulfur was added as thiophene. The reaction conditions for Example 37 through 41 in Table V below included a temperature of 550° C.; a pressure of 5 p.s.i.g. (0.33 atmospheres); and a hydrogen to isopentane mole ratio of 3; and a gaseous hourly space velocity based on the isopentane of 650 volumes of isopentane per volume of catalyst per hour.

TABLE V

[Effect of sulfur on the dehydrogenation of isopentane over a Pt-MgAl$_2$O$_4$ catalyst]

| Example number | Sulfur, p.p.m. | Reaction time (hr.) | Mole percent | | Coke* |
| --- | --- | --- | --- | --- | --- |
| | | | Conv. | Selec. | |
| 37 | 0 | 1 | 48 | 78 | |
| | | 6 | 39 | 82 | 61 |
| 38 | 86 | 1.5 | 48 | 82 | |
| | | 6 | 41 | 91 | 40 |
| 39 | 171 | 1.5 | 48 | 81 | |
| | | 6 | 43 | 88 | 28 |
| 40 | 306 | 1 | 55 | 78 | |
| | | 6 | 54 | 86 | 41 |
| 41 | 611 | 1 | 55 | 88 | |
| | | 5.5 | 51 | 88 | 37 |

* $\dfrac{\text{Gms. carbon}}{\text{Gms. catalyst/hr.}} \times 10^{-4}$

Referring to Table V, a comparison of the runs shows that the effect of sulfur is to increase selectivity and decrease coking results in high activity being maintained over the entire reaction period.

Another series of runs was made to study the dehydrogenation of isobutane over a platinum-magnesium aluminate spinel catalyst. The results of these runs are summarized in Table VI below.

The sulfur in the runs in Table VI was added as H$_2$S. The reaction conditions included a gas hourly space velocity of 1200 based on the isobutane; atmospheric pressure; and a hydrogen to isobutane mole ratio of 3.

TABLE VI

Dehydrogenation of isobutane over 0.2% Pt-MgAl$_2$O$_4$ catalysts

| Example number | Temp., °C. | Sulfur, p.p.m. | Reaction time (hr.) | Mole percent | | Coke* |
| --- | --- | --- | --- | --- | --- | --- |
| | | | | Conv. | Selec. | |
| 42 | 575 | 0 | 3.5 | 31 | 69 | 14 |
| 43 | 575 | 850 | 3.5 | 44 | 85 | 1 |
| 44 | 600 | 850 | 3.5 | 56 | 77 | 24 |
| 45 | 560 | 850 | 3.5 | 30 | 94 | 0.8 |
| 46 | 550 | 850 | 3.5 | 28 | 97 | 0.7 |
| 47 | 625 | 850 | 3.5 | 14 | 98 | 0.7 |

* $\dfrac{\text{Gms. carbon}}{\text{Gms. catalyst/hr.}} \times 10^{-4}$.

Referring to Table VI above, it can be seen that as was the case with propane, the addition of sulfur increases selectivity to the production of olefin and also increases conversion. It can be seen from the data in Table VI that as conversion increases with temperature, selectivity decreases. The addition of sulfur reduces coke formation dramatically, as shown by comparison of Examples 42 and 43.

Studies were also made to determine the effect of total surface area on the dehydrogenation activity of the magnesium aluminate spinel supported catalysts of this invention. It was found that increased temperatures of calcination of the magnesium aluminate spinel base resulted in decreased surface areas as the temperature of calcination was increased from 600° C. to 1000° C. for a 16-hour calcination period. At 600° C. calcination temperatures, the surface area of the support was about 120 m.$^2$/g., which decreased linearly to a surface area of about 35 m.$^2$/g. at a calcination temperature of about 1000° C. The support surface area appeared to have no effect on the apparent catalyst activity down to surface areas as low as 45 m.$^2$/g. Some effect was noted at 35 m.$^2$/g. surface area of a support, but only in the absence of H$_2$S.

Resort may be had to such variations and modifications as fall within the spirit of the invention and the scope of the appended claims.

We claim:

1. A process which comprises:
    contacting a charge stock comprising at least one acyclic saturated hydrocarbon having from three to six carbon atoms per molecue and from 10 to 1000 p.p.m. of a sulfur containing compound selected from the group consisting of H$_2$S and an organic sulfur containing compound capable of forming H$_2$S under the conditions of reaction in the vapor phase under dehydrogenation conditions including a temperature from 300° C. to 700° C. and in the presence of added hydrogen
    with a catalyst consisting essentially of platinum on a support consisting essentially of a magnesium aluminate spinel having a surface area from about 10 to about 250 m.$^2$/g.

2. A process according to claim 1 wherein the amount of platinum is from 0.01 to 5 weight percent and the acyclic saturated hydrocarbon has from 3 to 5 carbon atoms.

3. A process according to claim 2 wherein the spinel has a surface area from 40 to 200 m.$^2$/g. and a mean pore diameter from about 50 to 250 Å.

4. A process according to claim 3 wherein the saturated acyclic hydrocarbon is propane; the sulfur compound is H$_2$S; and the reaction temperature is 575° C. to 650° C.

5. A process according to claim 3 wherein the saturated acyclic hydrocarbon is isobutane and the reaction temperature is 500° C. to 600° C.

6. A process according to claim 3 wherein the saturated acyclic hydrocarbon is isopentane; the sulfur compound is thiophene; and the reaction temperature is 480° C. to 570° C.

7. A process according to claim 1 wherein a spinel is prepared by drying and calcining a spinel precursor obtained by precipitation from a solution of inorganic salts of magnesium and aluminum, in which the salts of the magnesium and aluminium are present as the cation thereof by adding a solution of the salts to a non-organic base selected from the group consisting of bases volatilizable under drying or calcining conditions and bases free of sodium while maintaining the pH of the addition mixture above about 8.

8. A process accoring to claim 7 wherein the magnesium and aluminum salts are the nitrates.

9. A process according to claim 7 wherein the saturated acyclic hydrocarbon is propane; the sulfur compound is H$_2$S; and the reaction temperature is 575° C. to 650° C.

10. A process which comprises:
    contacting a charge stock comprising at least one acyclic saturated hydrocarbon having at least four carbon atoms per molecule in the vapor phase under dehydrogenation conditions including a temperature from 300° C. to 700° C. and in the presence of added hydrogen with a catalyst consisting essentially of platinum on a support consisting essentially of a magnesium aluminate spinel having a surface area from about 10 to about 250 m.$^2$/g.

11. A process according to claim 10 wherein the saturated acyclic hydrocarbon has from 4 to 5 carbon atoms; the amount of platinum is from 0.01 to 5 weight percent; and the spinel has a surface area from 40 to 200 m.$^2$/g. and a mean pore diameter from about 50 to 250 Å.

12. A process according to claim 11 wherein the spinel is prepared by drying and calcining a spinel precursor obtained by precipitation from a solution of inorganic salts of magnesium and aluminum, in which the salts of the magnesium and aluminum are present as the cation thereof by adding a solution of the salts to a non-organic base selected from the group consisting of bases volatilizable under drying or calcining conditions and bases free of sodium while maintaining the pH of the addition mixture above about 8.

13. A process according to claim 1 wherein the hydrogen: hydrocarbon mole ratio is from 1:1 to 20:1 and the catalyst consists of platinum and rhenium on a support consisting essentially of a magnesium aluminate spinel having a surface area from about 10 to about 250 m.²/g.

14. A process according to claim 13 wherein said sulfur containing compound is selected from the group consisting of $H_2S$; $CS_2$; saturated aliphatic mercaptans having from 1 to 5 carbon atoms; thiophene; and substituted thiophenes where the substituents are lower hydrocarbon radicals having from 1 to 3 carbon atoms.

15. A process according to claim 14 wherein the acyclic saturated hydrocarbon has from 3 to 5 carbon atoms.

References Cited

UNITED STATES PATENTS

| | | | |
|---|---|---|---|
| 2,161,991 | 6/1939 | Baehr | 260—683.3 |
| 3,439,061 | 4/1969 | Henderson et al. | 260—683.3 |
| 3,632,662 | 1/1972 | Dyroff et al. | 260—683.3 |
| 3,585,250 | 6/1971 | Pasternak et al. | 260—683.3 |
| 3,670,044 | 6/1972 | Drehman et al. | 260—683.3 |

OTHER REFERENCES

Chem. Abs. Vol. 74:16051p, 1971. Niki forara, N. V. et al. Vests. Aked. Namb Belaries. SSR. Su. Khim. Nesuk 1970 (4) 61.4 (Russ.).

VERONICA O'KEEFE, Primary Examiner

PO-1050
(5/69)

UNITED STATES PATENT OFFICE
CERTIFICATE OF CORRECTION

Patent No. 3,842,139                     Dated  October 15, 1974

Inventor(s)  William L. Kehl and Raymond J. Rennard, Jr.

It is certified that error appears in the above-identified patent and that said Letters Patent are hereby corrected as shown below:

Col. 10, Table IV, under "Selec." insert --86-- under "77" across from Ex. 32

Signed and sealed this 18th day of February 1975.

(SEAL)
Attest:

RUTH C. MASON
Attesting Officer

C. MARSHALL DANN
Commissioner of Patents
and Trademarks